United States Patent [19]

Cohen

[11] 4,338,005
[45] * Jul. 6, 1982

[54] MULTIFOCAL PHASE PLACE

[76] Inventor: Allen L. Cohen, 10108 Windsong Terrace, Richmond, Va. 23233

[*] Notice: The portion of the term of this patent subsequent to Jul. 1, 1997, has been disclaimed.

[21] Appl. No.: 142,005

[22] Filed: Apr. 21, 1980

Related U.S. Application Data

[63] Continuation-in-part of Ser. No. 970,751, Dec. 18, 1978, Pat. No. 4,210,391.

[51] Int. Cl.³ .................. G02B 3/08; G02B 17/00; G02C 7/04; G02C 7/06
[52] U.S. Cl. ................... 351/161; 350/162 Z P; 350/444; 350/452; 351/168
[58] Field of Search ............... 351/160 R, 160 H, 161, 351/168; 350/162 Z P, 452, 444

[56] References Cited

U.S. PATENT DOCUMENTS 3,004,470 10/1961 Rühle .................... 350/452

OTHER PUBLICATIONS

Zieglar, J. F.; "Fabrication or Correction of Optical Lenses," *IBM Technical Disclosure Bulletin;* vol. 12 No. 10; Mar. 1970; pp. 1573–1575.

*Primary Examiner*—John K. Corbin
*Assistant Examiner*—Scott J. Sugarman

[57] ABSTRACT

A phase plate construction suitable for use in optical systems with multifocal requirements. It is designed as a phase plate in order to provide sharp and clear focii with bright images. This is accomplished by adjusting the Fresnel echelettes and the zone plate spacings, of the phase plate, such that the Fresnel lens focii coincide with particular zone plate focii.

12 Claims, 7 Drawing Figures

MULTIFOCAL PHASE PLACE

CROSS REFERENCE TO RELATED APPLICATION

This application is a continuation-in-part of application Ser. No. 970,751 filed Dec. 18, 1978, now U.S. Pat. No. 4,210,391.

BACKGROUND OF THE INVENTION

This invention relates to multifocal optical devices which have their multifocal property distributed approximately throughout said devices, and more particularly to multifocal zone plates as described in my Patent Application Ser. No. 970,751 now U.S. Pat. No. 4,210,391.

A multifocal Fresnel lens has been previously described as a lens consisting of a plurality of annular rings, the surfaces of which are made part of a carrier lens, and have the same inclinations to the optical axis, in a repetitive interleaving pattern, as the individual surfaces of the separate single focal power lenses that they wish to combine.

The comcept of a multifocal zone plate was developed as an improvement on the multifocal Fresnel lens, wherein the geometrical spacings of the annular rings of said multifocal Fresnel lens, were set to obey the usual spacing of a zone plate diffraction grating.

Multifocal zone plane mirrors as well as lenses have been described.

However, one can make an improvement in these designs as relates to the quality of the images formed at each of the focal points, by applying phase plate considerations as described by A. I. Tudorovskii in his article "An objective with a phase plate", Optics & Spectroscopy, Feb. 1959. Multifocal phase plates can be designed in such a manner as to cause the light coming to focus at one focal point, to be bright and clear, without the superposition of light passing through zones meant to focus such light to the other focal points.

In order to understand the nature of the problem, we note that in an ordinary monofocal lens all of the incident light comes to focus in phase at the single focal point. However, in an annular zone bifocal Fresnel lens with two focal points, the incident light is shared between the two focal points. For example, we may have half of the incident light pass through the odd zones before being brought to sharp focus at one focal point. But, we will also have, superimposed at this focal point, a blurred image formed by incident light passing through the even zones.

SUMMARY OF THE INVENTION

The purpose of a multifocal lens, is to increase the number of focii to which incident light will converge. Unfortunately, whenever this has been done, it has been accompanied by the superposition of spurious blurred images at each of the focii.

The present invention makes use of the fact that, in a phase plate, the Fresnel echelettes (or optical facets) can be adjusted to diffract light to particular focii of the zone plate. In this case there will be a significant improvement in the quality of imaged light as these focii.

To explain how this invention achieves its purpose, we may refer to FIGS. 1-4. In FIG. 1, we see an interface I, between two different optical media with respective indices of refraction n and n', an optical axis AA' cutting the interface at O, and two focal points $+d$ and $-d$, on the optical axis. We also see, that the region of index n', is divided into conical half-wave zones bounded by the surfaces $s_1, s_2, s_3, \ldots$, which intersect the interface I, in circles of radii $r_1, r_2, r_3, \ldots$, as shown in FIG. 2. The radii are given by the half-wave zone plate formula, $r_m = \sqrt{m\lambda d}$ with $\lambda$ = wavelength of light, m is an integer, and the positions $\pm d/N$ along the optical axis are called "focal points", with N an integer not related to m. Now let us consider the odd zones (those bounded on the outside by $r_m$ with m odd) separately from the even zones (those bounded on the outside by $r_m$ with m even). Considering first the odd zones, we introduce sphero-triangular Fresnel echelettes as shown in FIG. 3. If the index of refraction of the Fresnel echelettes is n", then we can choose the depth of each ledge to be $\lambda/2(n''-n)$. In this situation all of the odd zones will focus light parallel to the optical axis AA' and incident upon the interface I, to the focal point $+d$. Furthermore, all of the focussed light will arrive in phase, contributing to a "brightened" image as compared to an image produced by a zone plate without Fresnel echelettes.

Now considering the even zones, we introduce the Fresnel echelettes to diffract incident parallel light as if it came from the focal point $-d$. This situation is shown in FIG. 4. Now this composite lens of FIG. 4, exhibits an unexpected property. When we consider incident parallel light passing through the even zones, we find that such light approximately exhibits, complete destructive interference at the focal point $+d$. The situation is similarly true for incident parallel light, passing through the odd zones, with respect to the focal point $-d$. This means, that at these two focal points, we can get sharp clear images without the superposition of blurred images.

Finally, we can complete the construction of a bifocal phase plate lens, by altering the front surface I and providing a back surface B, in order to produce a carrier power F, that can shift the focal points, $-d$ and $+d$, to any desired positions such as $f_1 = f - d$ and $f_2 = F + d$ (see FIG. 5).

In identical fashion, we can construct another multifocal phase plate, by choosing the odd zone optical facets to direct light to the $+d/2$ focal point, and the even zone optical facets to direct light to the $-d/2$ focal point. In fact, we can construct clear image multifocal phase plates as described above, by using optical facets (echelettes) that alternately focus light to the $+d/N$ focal point and the $-d/N$ focal point, where N is an integer.

The present invention is summarized in a multiple power annular, concentric zones, bounded on the outside by radii $r_n$, with $n = 1, 2, 3, \ldots$; a focal power means within at least some of the zones for directing incident parallel light to the focal point $+d/N$, with N an integer; another focal power means within at least some of the zones for directing incident parallel light to the focal point $-d/N$; wherein the radii $r_n$ of said zones are substantially proportional to the square root of n; and wherein the absolute value of $r_1$ is set equal to $\sqrt{\lambda d}$, with $\lambda$ equal to the wavelength under consideration, and d is an arbitray focal point, relating to the use of the invention.

An important advantage of this invention, is that its performance as a multifocal optical element is not degraded by the superposition of blurred images at the focal points, a situation which is inherent in the usual multifocal lens designs.

Other objects and advantages of the present invention will be more fully apparent from the following description of the preferred embodiments when taken in conjunction with the accompanying drawings.

DESCRIPTION OF THE PREFERRED EMBODIMENTS

Figure 1:
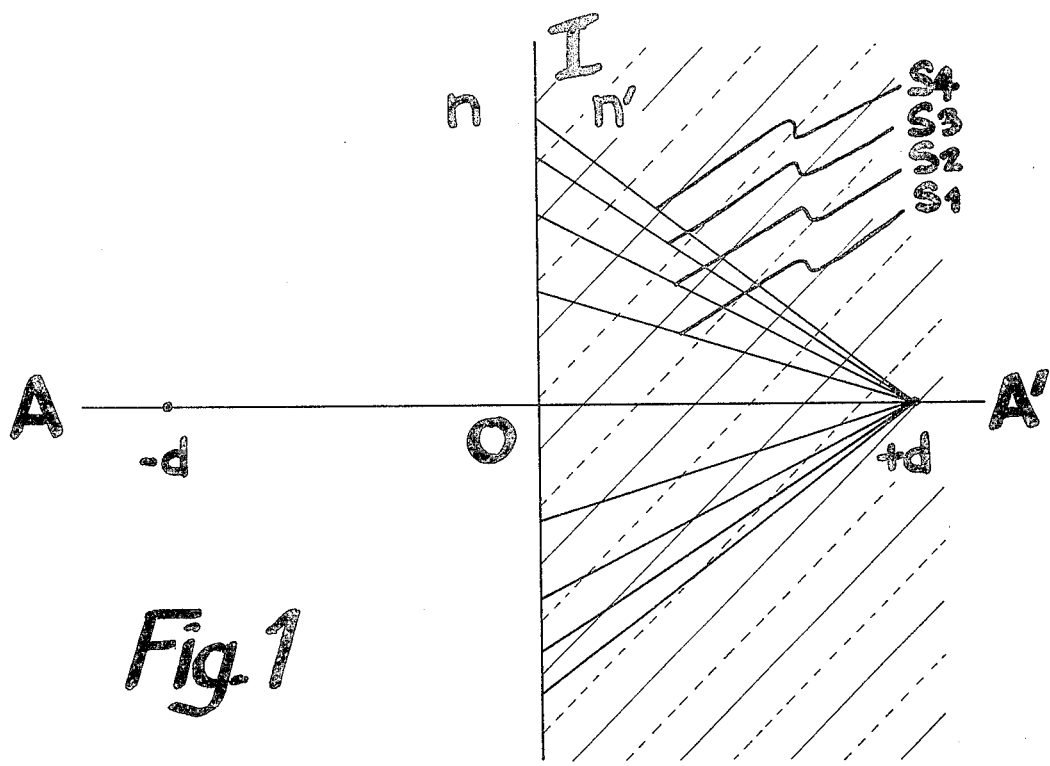
FIG. 1 shows the cross-section of a pattern of concentric conical surfaces demarcating the half wave zones of a phase plate.
Figure 2:
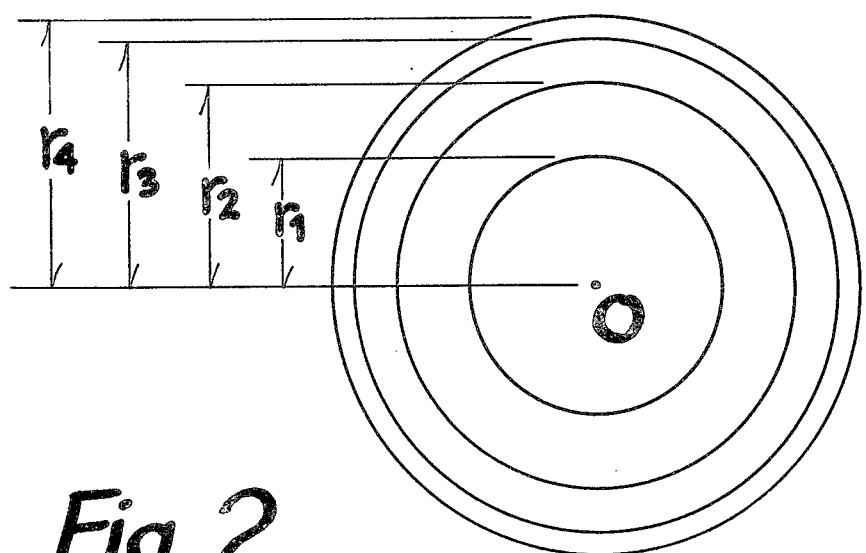
FIG. 2 shows a front view of a phase plate illustrating the circular intersections of the conical half wave zones at the interface I.
Figure 3:
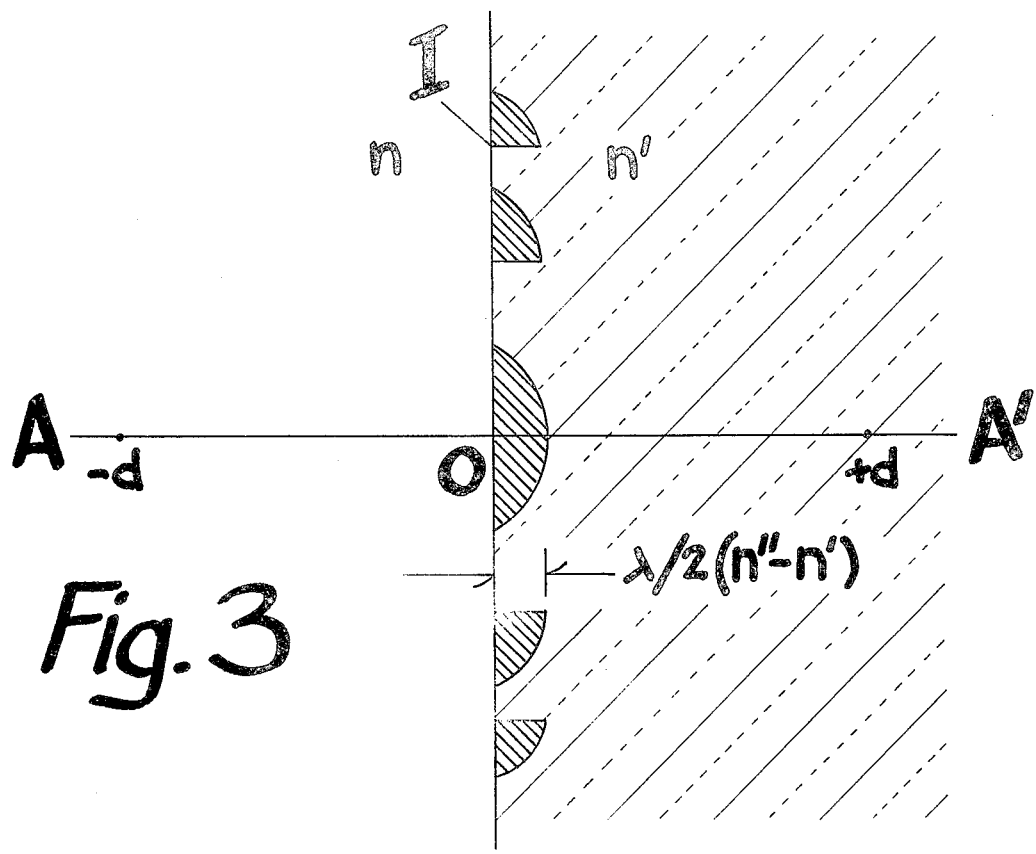
FIG. 3 shows a cross-sectional view of a portion of a phase plate with optical facets implanted into the odd zones only.
Figure 4:
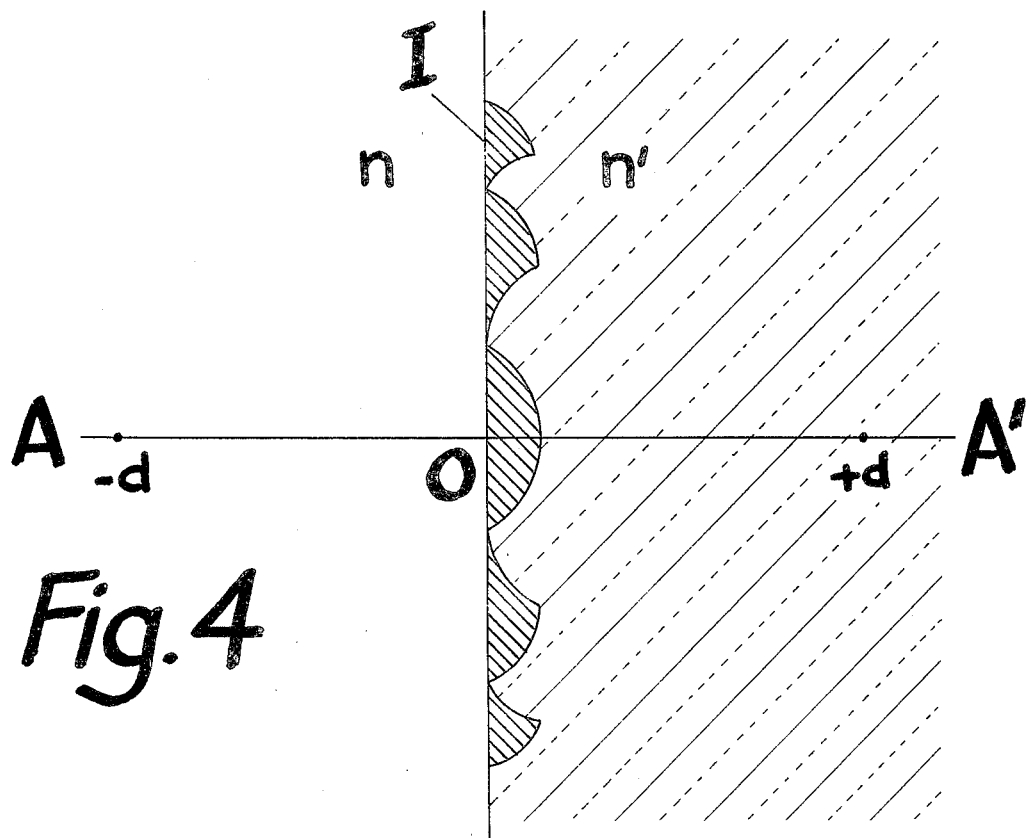
FIG. 4 shows a cross-sectional view of a portion of a phase plate formed without any non optical ledges by smoothly merging the optical facets of the odd and even zones.
Figure 5:
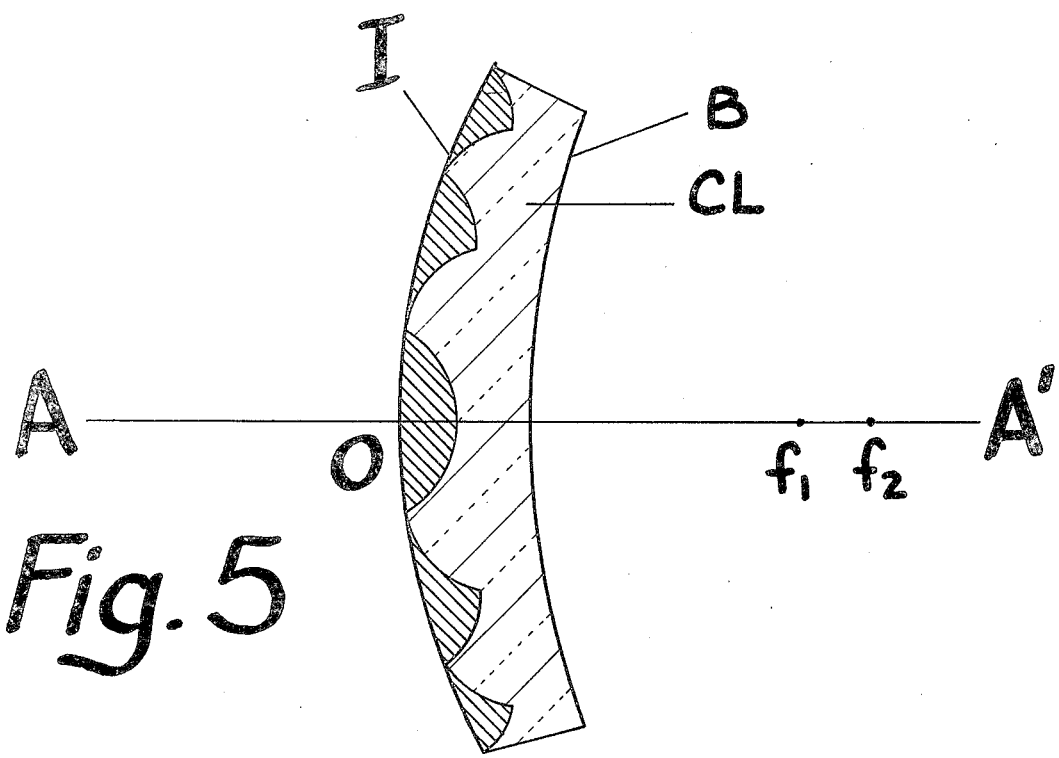
FIG. 5 shows a cross-sectional view of a portion of a bifocal plane plate formed by ion implementation in accordance with one embodiment of the present invention.

In the embodiment of the invention as shown in FIG. 5, we have by way of illustration, the anterior surface I of a carrier lens or body CL divided into five concentric zones, bounded by radii $r_1$–$r_5$, in such a manner as to form a bifocal phase plate. The carrier lens or body of course, is constructed according to the usual principles governing the design of an optical lens with the surfaces I and B either spherical, sphero-cylindrical, or of any other appropriate lens design. The spherical, sphero-cylindrical, or aspherical power F of the carrier lens depends, according to the standard lens formulas, on the curvatures of the anterior and posterior surfaces I and B respectively, the center thickness CT, and refractive index of the carrier lens. These parameters are in turn, determined by the intended use of the multifocal phase plate and the materials available. For example, the posterior surface B may be shaped so as to minimize off axis optical aberrations if the multifocal phase plate is to be used as a spectacle lens. Standard optical materials such as glass, plastic, etc., or any other optically refracting materials may be used in the fabrication of this and all subsequent embodiments.

In this present configuration, a zone is determined as odd if it is bounded on the outside by a radius $r_n$ with n being an odd integer, and even if n is an even integer. The optical facets of the odd zones correspond in inclination to the particular focal power $+1/d$, while the optical facets of the even zones correspond to the particular focal power $-1/d$. The inclinations of the facets must be constructed according to the principles of Fresnel zones as discussed by H. Ruhle in his U.S. Pat. No. 3,004,470, and in this case all have a common depth of $\lambda/2 (n'' - n')$ where $\lambda$ is the wavelength of light, $n''$ is the index of refraction of the optical facets, and $n'$ is the index of refraction of the carrier lens.

A particular advantage of this configuration, is the elimination of shadow effects caused by non optical ledges separating the optical facets in usual Fresnel lens constructions.

The spacing of the annular zones is of course given by the zone plate formula for $r_n$. In particular, the radii $r_n$, demarcating the boundaries between the annular zones are determined by $r_n = \sqrt{nd\lambda}$, where $n = 1, 2, 3, \ldots, \lambda$ is equal to the wavelength of light under consideration, and d represents a focal length.

The new and important feature of the embodiment, and of all the subsequent embodiments, is the particular focussing power of the optical facets. In my invention the optimal image quality occurs when the Fresnel zone focii of the optical facets, coincide with the zone plate focii at $\pm d/N$ with N an integer. Furthermore, since we are dealing with a spectacle lens in this embodiment, we have chosen $\lambda$, the wavelength under consideration, to be equal to 555 nm. This is of course close to the wavelength to which the human eye will accommodate under normal viewing situations. The wavelength under consideration will be different for other uses of my invention.

A fabrication method for producing such a lens is that of ion implantation into a smooth surfaced carrier lens. This procedure is discussed by J. F. Ziegler in his article "Fabrication or Correction of Optical Lenses," IBM Technical Disclosure Bulletin, Vol. 12, No. 10, Mar. 1970, pp. 1573–1575. The Fresnel zones are actually formed by the imbedding of contaminants into the carrier lens or body CL which thereby alters its refractive index. Of course the formation of different zones may require different contaminants.

Figure 6:
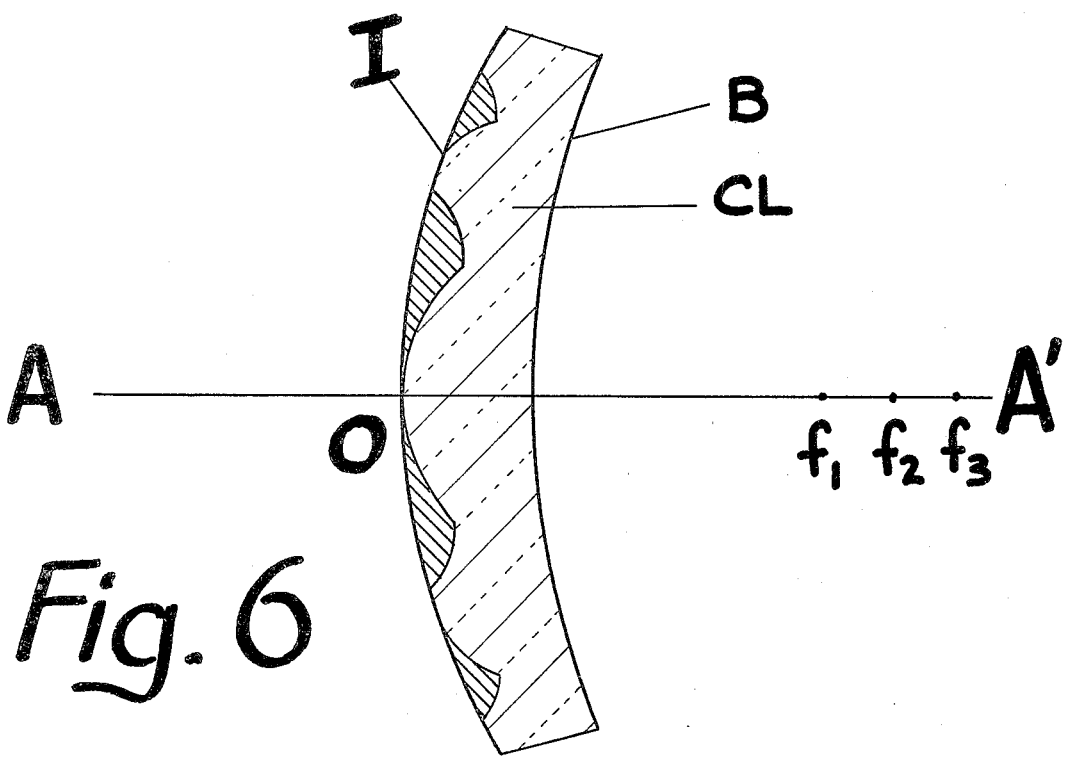
FIG. 6 shows a cross-sectional view of a portion of a trifocal phase plate formed by ion implantation in accordance with another modification of the present invention.

Another embodiment of the present invention, which utilizes ion implantation, is shown in FIG. 6, where we are illustrating a trifocal phase plate. Here the first and fourth zones have echelettes for focussing light to the focal point $-d/2$; the second and fifth zones have echelettes for focussing light to the focal point $+d/2'$ while the third and sixth zones have no imbedded echelettes at all which will result in providing the focal power of the carrier lens itself.

Figure 7:
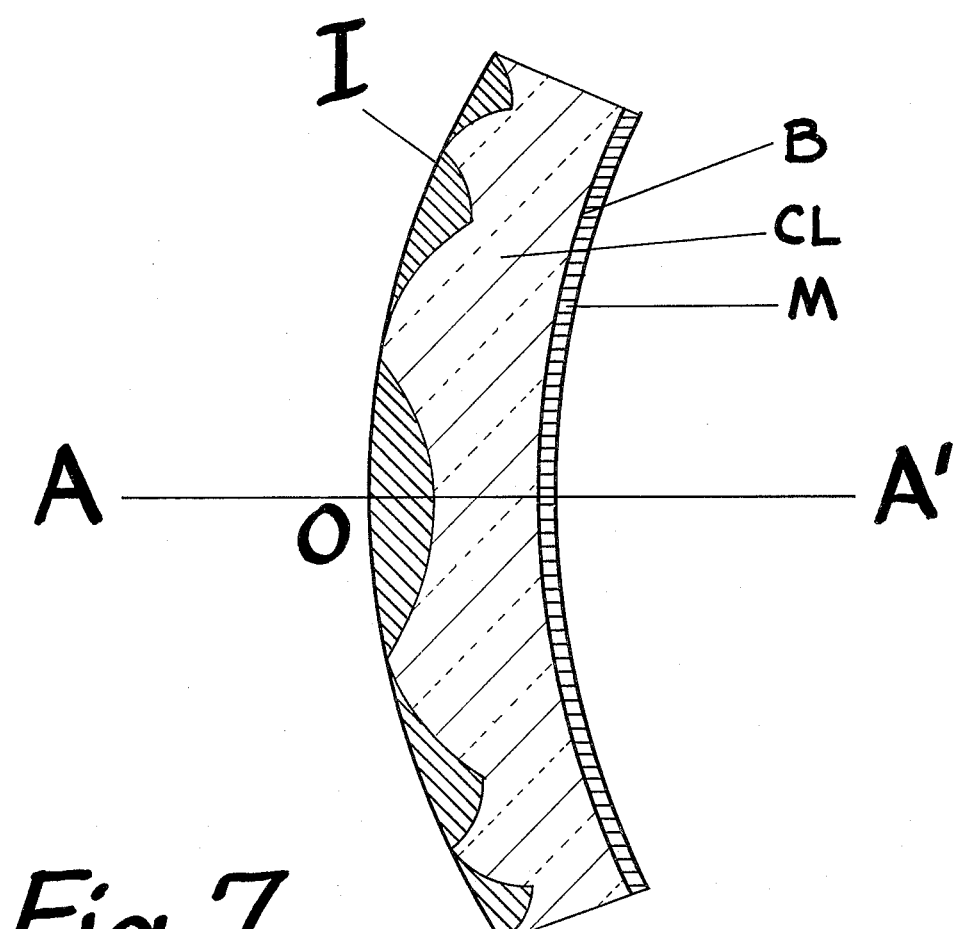
FIG. 7 is a cross-sectional view of a portion of a multifocal phase plate lens-mirror, with the lens formed by ion implantation in accordance with the present invention.

In FIG. 7 we see a compound lens-mirror system. The mirror M has a reflective surface B, and onto this surface an optically refractive material is deposited to form a lens CL. The Fresnel zones are than formed in the lens by ion implantation. All of the design features illustrated in FIGS. 5 and 6 are directly applicable, and will produce different and useful embodiments of a multi-focal phase plate lens-mirror.

It should be understood, of course, that the foregoing disclosure relates only to the preferred embodiments of the invention, and that numerous modifications or alterations may be made therein, without departing from the spirit and scope of the invention as set forth in the appended claims.

What is claimed is new and desired to be protected by letters Patent is:

1. A multiple focal power optical device comprising: body means having a plurality of alternating annular, concentric zones, bounded on the outside by radii $r_n$, with $n = 1, 2, 3, \ldots$;

first focal power means within at least some of the zones for directing incident parallel light to a first focal point $+d/N$, with N an integer;

second focal power means within at least some of the zones for directing incident parallel light to a second focal point $-d/N$;

wherein the radii $r_n$ of said zones are substantially proportional to the square root of n;

and wherein the absolute value of $r_1$ is set equal to $\sqrt{\lambda d}$, with $\lambda$ equal to the wavelength under consideration, and d is chosen arbitrarily.

2. The invention of claim 1 wherein said body means comprises an optically refracting material.

3. The invention of claim 2 wherein said first and second focal power means comprise a plurality of discreet refracting elements within their respective annular zones.

4. The invention of claim 3 wherein at least some of said optically refracting elements include contaminants imbedded in said body means to achieve the desired focal powers.

5. The invention of claim 4 wherein the discreet refractive elements of the first focal power means occupy every odd zone, and the discreet refractive elements of the second focal power means occupy every even zone.

6. The invention of claim 1 further including a third focal power means within at least some of the annular zones.

7. The invention of claim 1 wherein the first focal power means directs incident parallel light to the focal point $+d$, and wherein the second focal power means directs incident parallel light to the focal point $-d$, and further wherein the second focal power means occupys every zone not occupied by the first focal power means.

8. The invention of claim 1 wherein the body means is designed to act as an ophthalmic bifocal spectacle lens.

9. The invention of claim 7 wherein the body means is designed to act as an ophthalmic bifocal spectacle lens.

10. The invention of claim 1 wherein the body means is designed to act as an ophthalmic bifocal contact lens.

11. The invention of claim 7 wherein the body means is designed to act as an opthalmic bifocal contact lens.

12. The invention of claim 1 wherein the said body means comprises an optically reflecting material.

* * * * *